(No Model.) 2 Sheets—Sheet 1.

N. C. SAMPLE.
REIN HOLDER.

No. 506,944. Patented Oct. 17, 1893.

WITNESSES:
Thomas M. Smith.
Richard C. Maxwell.

INVENTOR:
Newton C. Sample,
By J. Walter Douglass,
ATT'Y.

(No Model.) 2 Sheets—Sheet 2.
N. C. SAMPLE.
REIN HOLDER.
No. 506,944. Patented Oct. 17, 1893.
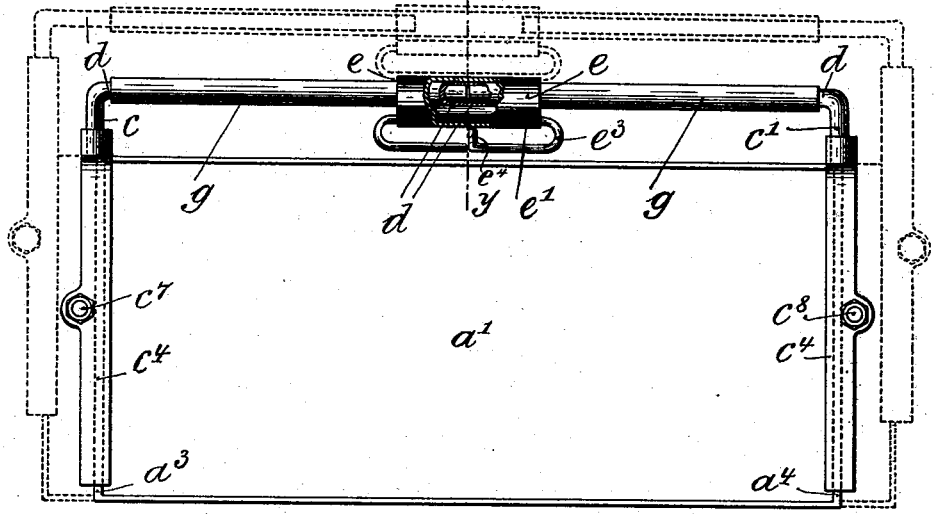
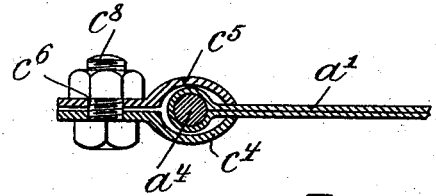
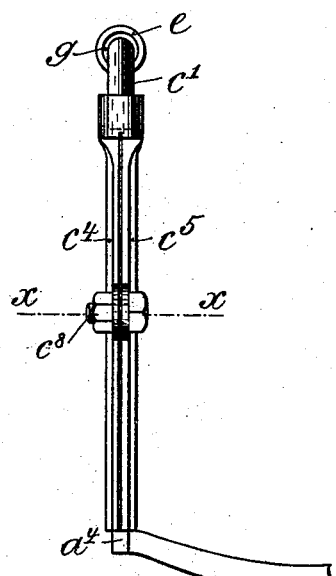
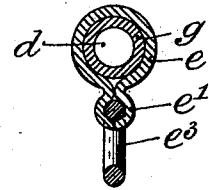
WITNESSES:
Thomas M. Smith.
Richard C. Maxwell.
INVENTOR:
Newton C. Sample,
By J. Walker Douglass.
ATT'Y.

UNITED STATES PATENT OFFICE.

NEWTON C. SAMPLE, OF PHILADELPHIA, PENNSYLVANIA.

REIN-HOLDER.

SPECIFICATION forming part of Letters Patent No. 506,944, dated October 17, 1893.

Application filed August 2, 1893. Serial No. 482,189. (No model.)

*To all whom it may concern:*

Be it known that I, NEWTON C. SAMPLE, a citizen of the United States, residing at the city of Philadelphia, in the county of Philadelphia and State of Pennsylvania, have invented certain new and useful Improvements in Rein Holding and Directing Devices, of which the following is a specification.

My invention has relation to a rein supporting and directing device for vehicles, such as buggies, carriages or the like.

The principal objects of my invention are, first, to provide a simple rein-holding and directing device detachably connected with the dash-board or like member of a vehicle; second, to provide a rein-holding and directing device adjustably connected with the dash-board of a vehicle and the parts thereof so arranged as that the same may be detached or folded together as occasion may require; third, to provide a rein supporting and directing appliance for a vehicle so constructed and arranged as that the rein supporting and directing member thereof may be caused to assume any required position; and fourth, to provide a vertically and laterally adjustable rein supporting and directing device so arranged as that the required position for the reins may be always insured through the to and fro movement afforded thereto.

My invention consists of the improvements in a rein supporting and directing appliance hereinafter described and claimed.

The nature, characteristic features and scope of my invention will be more fully understood from the following description taken in connection with the accompanying drawings forming part hereof; and in which—

Figure 1:
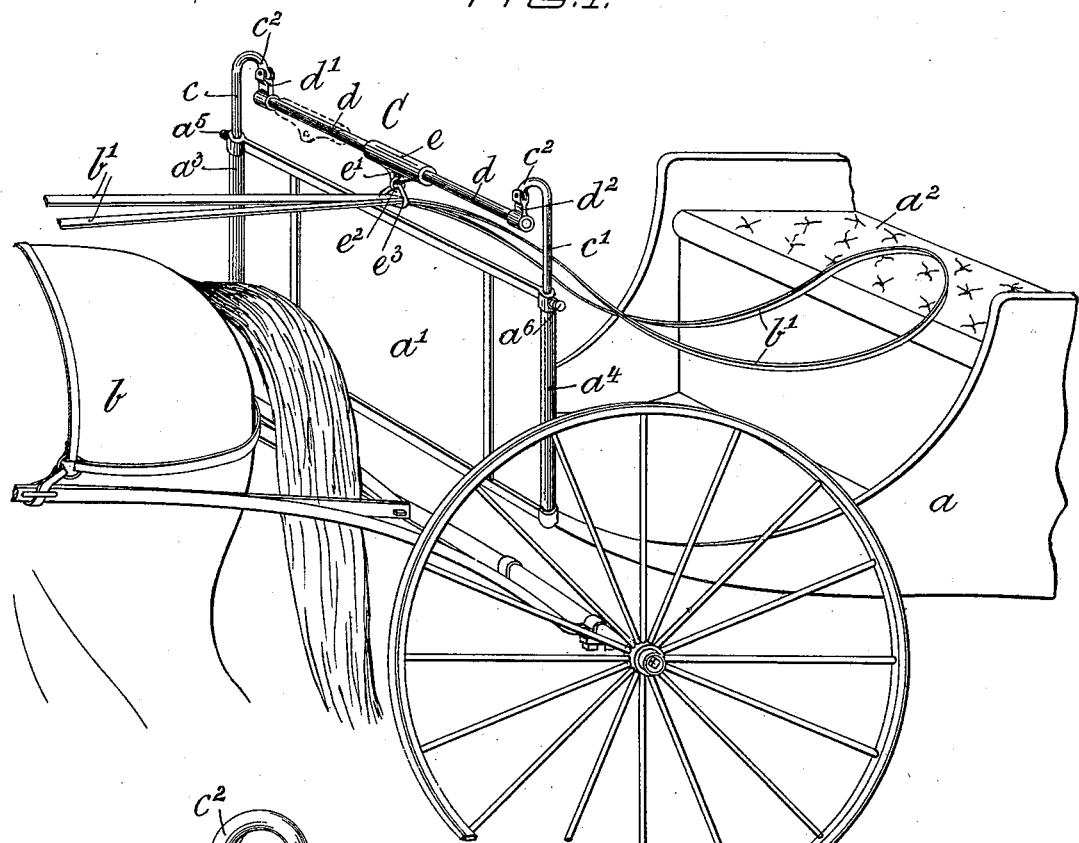
Figure 2:
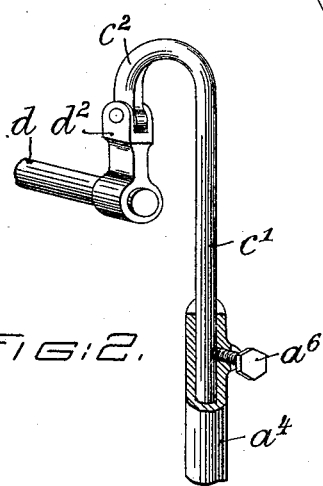
Figure 3:
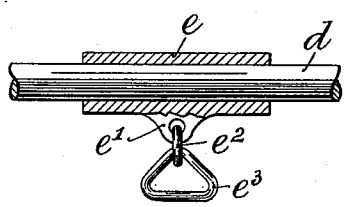

Figure 1, is a perspective view of a portion of the body of a vehicle with a horse represented as being attached thereto and with my invention in one of its forms shown in application to the dash-board of the vehicle and also with a pair of reins extending through the swinging loop or eye of the supporting and directing device forming a part of my present invention. Fig. 2, is a perspective view of one of the vertical hooked standards, showing a portion of the horizontal bar with a coupling device applied thereto and pivotally connected with said standard. Fig. 3, is a view partly in central section and partly in elevation of the horizontal bar and the slider or sleeve with its swinging loop or eye. Fig. 4, is a view partly in front elevation and partly in broken section of a dash-board with a modified form of rein supporting and directing device of my invention shown in application thereto and in dotted lines illustrating the manner the same may be adjusted both vertically and laterally to accommodate the appliance to dash-boards of different dimensions. Fig. 5, is an end elevational view of the device illustrated in Fig. 4. Fig. 6, is a transverse section on the line $x$—$x$, of Fig. 5; and Fig. 7, is a vertical central section on the line $y$—$y$, of Fig. 4, of a slightly modified form of the slider or sleeve with its swinging loop or eye of the rein supporting device of my invention.

Referring to the drawings $a$, is the body of a vehicle provided with a dash-board $a'$, and with a seat $a^2$. This dash-board has end hollow posts or standards $a^3$ and $a^4$, Figs. 1 and 2, and tightening-screws $a^5$ and $a^6$.

$b$, represents a horse suitably harnessed to the vehicle.

$b'$, are a pair of reins extending through the loop of the rein-supporting and directing device to be hereinafter fully described. This rein-supporting and directing device C, comprises a frame-work consisting of two vertical rods $c$ and $c'$, Fig. 1, crooked at their upper extremities as at $c^2$.

$d$, is a horizontal rod provided at their respective extremities with coupling devices $d'$ and $d^2$, having bifurcated ends pivotally connected with the crooked ends of the vertical rods $c$ and $c'$. Mounted on the horizontal rod $d$, is a sleeve or slider $e$, provided with a projection $e'$, and with an eye $e^2$, into which engages a triangular or other shape guide or loop $e^3$. The horizontal rod $d$, by reason of its pivotal connection with the crooked vertical rods $c$ and $c'$, is afforded a range of to and fro movement, and the sleeve or slider $e$, loosely mounted thereon may be caused to assume a position midway in the length thereof as illustrated in Fig. 1, or to the right or left of the middle of said rod, as indicated by the dotted lines in said figure, by simply, while the reins are in engagement with the loop or guide $e^3$, of the sleeve $e$, causing the same to be moved through the intervention of said reins to the right or to the left of the middle so that the reins can be caused to assume the required position with respect to the location of the occupant of the vehicle doing the driving of the animal.

The vertical rods $c$ and $c'$, may be adjusted in the dash-board end standards or hollow posts $a^3$ and $a^4$, by loosening the tightening-screws $a^5$ and $a^6$, in a well understood manner, whereby the supporting and directing device may be maintained clear of the horse's back and in such manner as that the animal's tail cannot become entangled with the reins.

The rein-holding and directing device of Fig. 1, may be removed from the dash-board end standards or hollow posts by loosening the tightening-screws $a^5$ and $a^6$, from their engagement with the vertical rods $c$ and $c'$, and folding these rods onto the horizontal bar $d$, pivotally connected therewith in such manner as that the entire appliance may be placed beneath the seat of the vehicle. The rods $c$ and $c'$, are shown in Fig. 1, as being round, but they may, however, be made square or any other shape required.

With reference to Figs. 4 to 7, which illustrate a modification of the devices of my invention $a'$, is the dash-board of the vehicle. $c$ and $c'$, are the vertical rods having formed integral therewith horizontal arms $d$. The vertical rods are provided with divided depending members $c^4$ and $c^5$, having transverse projecting seats with threaded openings $c^6$, therein for the reception of tightening-screws $c^7$ and $c^8$, whereby the divided members of the vertical rods $c$ and $c'$, may be readily clamped to and unclamped from the end-posts $a^3$ and $a^4$, of the dash-board $a'$, in the manner illustrated in Figs. 4 and 5. $g$, is a tube or pipe mounted on the horizontal arms $d$. $e$, is the slider or sleeve provided with a swinging loop $e^3$, which is connected with the projection $e'$, formed in this instance into a bearing eye or tube for the reception of the loop $e^3$. This loop is provided with a central lug or projection $e^4$, forming a partition for preventing the reins becoming crossed. The slider or sleeve $e$, is so constructed and arranged as to be afforded a range of to and fro movement along the tube $g$, which is supported in position on the horizontal arms $d$, integrally formed with said vertical rods $c$ and $c'$. The construction and arrangement of the device of Fig. 4, is such as that the same may be adjusted both vertically and horizontally with respect to the dash-board of the vehicle in order to adapt the same to dash-boards of different dimensions, and the slider or sleeve $e$, is so arranged as that the reins can be caused to assume in connection therewith the required position with respect to the location of the driver seated in the vehicle, as will be readily understood by reference to Figs. 1 and 4.

It will be manifestly obvious that as to minor details further modifications may be made with respect to my invention, without departing from the spirit thereof; and hence I do not wish to be understood as limiting myself to the precise construction and arrangement of parts of the device as hereinbefore explained.

Having thus described the nature and objects of my invention, what I claim as new, and desire to secure by Letters Patent, is—

1. The combination, with a vehicle provided with a dash-board having end posts or standards, vertical arms adjustably connected with said end posts or standards, a cross-rod movably connected with said arms, a movable sleeve mounted on said cross-rod and provided with a swinging-loop, substantially as and for the purposes set forth.

2. A rein-supporting and directing device provided with two vertical members, a horizontal member, coupling devices connecting said vertical members with said horizontal member and a slider or sleeve mounted on said horizontal member and provided with an eye or loop afforded a range of movement transversely to said horizontal member, substantially as and for the purposes set forth.

3. The combination, with a vehicle having a dash-board, of a rein-supporting and directing device provided with two vertical members having horizontal members and with divided portions provided with seats, means for clamping said vertical members to said dash-board, a detachable tube mounted on said horizontal members, and a slider or sleeve afforded a range of movement on said tube, substantially as and for the purposes set forth.

4. The combination, with a vehicle having a dash-board, of a rein-supporting and directing device provided with two vertically adjustable arms, means for detachably clamping said arms to said dash-board and a horizontal member movably connected with said vertical members, and a slider or sleeve with a loop or eye adapted to be afforded a range of movement on said horizontal member, substantially as and for the purposes set forth.

In testimony whereof I have hereunto set my signature in the presence of two subscribing witnesses.

NEWTON C. SAMPLE.

Witnesses:
 THOMAS M. SMITH,
 RICHARD C. MAXWELL.